Patented Nov. 18, 1947

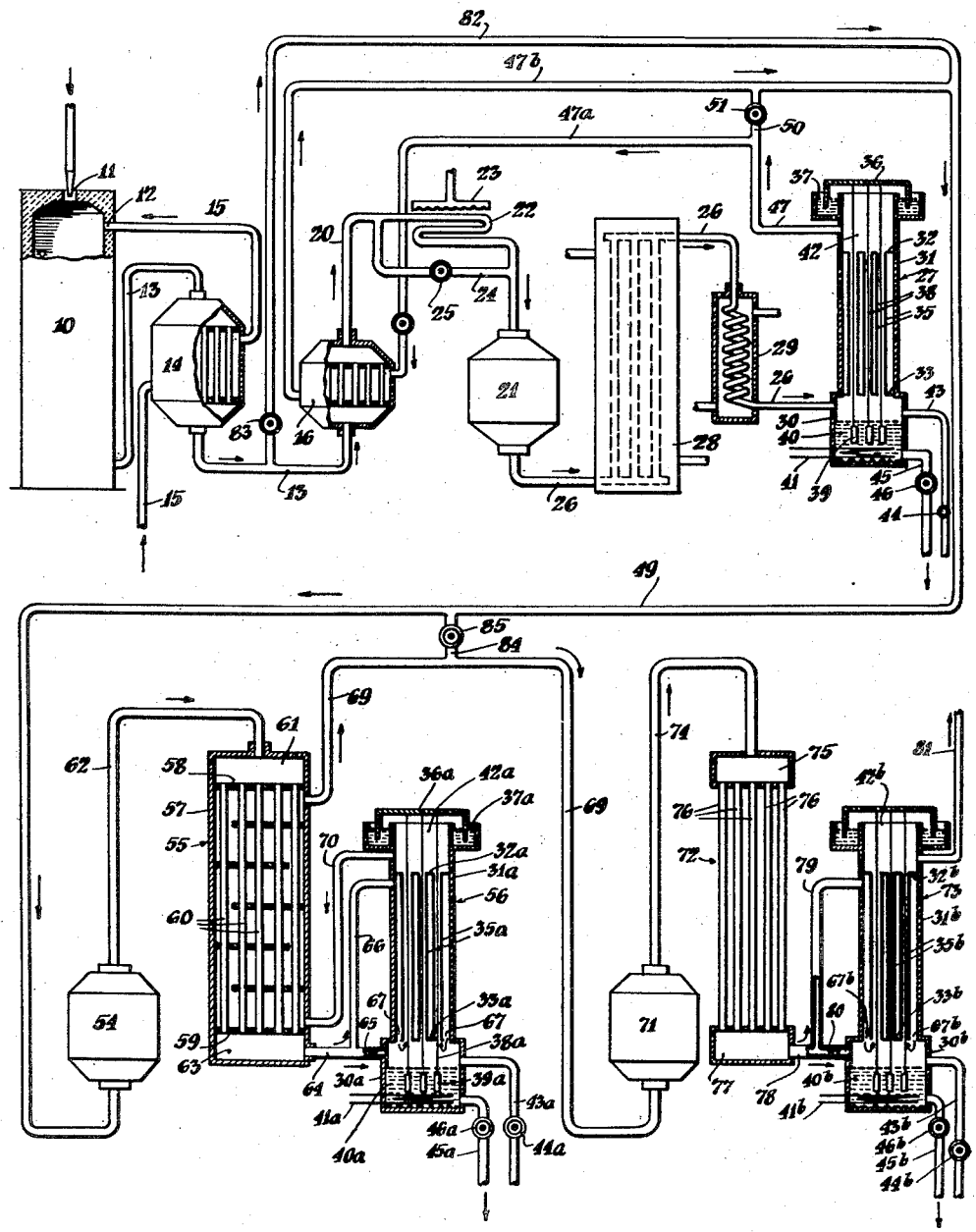

2,431,236

UNITED STATES PATENT OFFICE 2,431,236

PRODUCTION OF SULPHUR FROM GASEOUS MIXTURES

Edward P. Fleming, Los Angeles, Calif., and T. Cleon Fitt, Salt Lake City, Utah, assignors to American Smelting and Refining Company, New York, N. Y., a corporation of New Jersey Application August 4, 1943, Serial No. 497,336

8 Claims. (Cl. 23—226)

This invention relates to the production of sulphur from gaseous mixtures wherein the sulphur is in the form of sulphur dioxide, hydrogen sulphide or the like.

While the invention is particularly suited to the production of brimstone from the metallurgical gases produced in the smelting or roasting of sulphide ores, its principles may be adapted to the recovery of sulphur from other gaseous mixtures which contain sulphur in the form of sulphur dioxide, hydrogen sulphide, and the like.

According to the invention, a system is provided whereby the process of converting the sulphur compounds to elemental sulphur may be controlled in the various stages in such manner that an efficient recovery of sulphur is effected and brimstone of exceptionally high quality may be produced on a commercial scale.

In accordance with a preferred form of utilizing the principles of the invention, the gases containing sulphur dioxide are treated in a three stage catalytic converter system. Initially, clean raw gas containing sulphur dioxide is caused to react in a reduction furnace with hydrocarbon fuel such as natural gas at a temperature preferably above 1200° C. for rapid reduction of sulphur dioxide. The gas stream containing the resulting products of the reaction is then cooled to about 425°–450° C. and passed through the first stage of the conversion system, first into a first catalyst chamber containing a suitable catalyst where additional amounts of sulphur compounds are converted to elemental sulphur. The gas stream is then cooled in the first stage of the system to about 120°–140° C. and passed through a sulphur precipitating unit wherein a substantial quantity of the elemental sulphur in the gas stream is removed. This cooling, however, has the effect of creating a condition opposing the reduction of the sulphur compounds to elemental sulphur. To convert the sulphur compounds then existing in the gas stream and particularly the hydrogen sulphide contained therein, the gas stream is then heated to a temperature of about 200° to 250° C. and passed through the second stage of the converter system, first through a catalyst chamber containing a catalyst wherein further quantities of the sulphur compounds are converted into elemental sulphur. The reaction is exothermic. Accordingly, there is, in the large scale production contemplated by the invention, a great amount of heat generated which results in increasing the temperature of the gas a substantial amount which is represented by sensible heat in the gas stream. Inasmuch as the sensible heat must be removed to reduce the temperature to the point where the sulphur can be effectively removed from the gas stream by electrical precipitation, the arrangement of the system is such that sufficient of the sensible heat in the gas stream is utilized to stabilize the temperature of the second electrical precipitating unit to maintain it at a temperature best suited to the precipitation and removal of the sulphur from the gas stream. At the same time the gas stream from the precipitator in the second stage of the system may be utilized by means of a heat exchanger to extract sensible heat out of the gas stream discharged from the second catalytic chamber, sufficient in amount to raise the gas stream from the second precipitator to about 200° C. or higher at which temperature the gas stream, which may still contain relatively small but important amounts of sulphur dioxide and hydrogen sulphide, may be converted to elemental sulphur, precipitated from the gas stream and collected in the third and final stage of the system. In the third stage, the gas stream is passed through a third catalyst chamber containing a catalyst wherein additional quantities of elemental sulphur are formed. The gas stream is then again cooled to a suitable temperature for precipitation in the third precipitating unit and the sensible heat in the steam is utilized to stabilize the temperature in the third precipitating unit. The residual gas stream is then vented to the atmosphere.

Although the novel features which are believed to be characteristic of this invention will be particularly pointed out in the claims appended hereto, the invention itself, as to its objects and advantages, and the manner in which it may be carried out, may be better understood by referring to the following description in connection with the accompanying drawing forming a part thereof in which the single figure shows, in more or less diagrammatical fashion, a form, partly in cross section, of a typical plant embodying the system of the invention.

In the following description and in the claims, parts are identified by specific names for convenience, but they are intended to be as generic in their application to similar parts as the art will permit.

Referring to the drawing, 10 represents a reduction furnace which preferably is designed to operate on the down-draft principle. It is provided with a natural gas inlet 11 and a gas inlet 12 for the raw gas from which sulphur is to be recovered. The furnace is provided with an outlet conduit 13 which leads through a first heat exchanger 14.

A conduit 15 for the raw gas passes through a first heat exchanger 14 in heat interchange relationship with conduit 13.

A conduit 20, being a continuation of conduit 13, leads from the second heat exchanger 16 to the first catalyst chamber 21 which is charged with a catalyst mass. We prefer to use bauxite as a catalyst although it is within the contemplation of the invention that other catalysts may be used. The conduit 20 is provided with a trombone cooler 22, the temperature of which may be adjusted by means of a water spray header 23. A branch conduit 24 provides a by-pass around the trombone cooler 22. It is provided with a valve 25 for regulating the amount of the gas stream passing through this cooler.

Leading from the first catalyst chamber 21 (conveniently called a converter) is a conduit 26 which is connected to a first sulphur precipitator 27. This conduit passes through a first cooler 28 which may, if desired, be in the form of a waste heat boiler, and then through a second cooler 29 which, if desired, may be in the form of a boiler feed water heater and designed to provide delicate and accurate adjustment of the temperature of the gas stream entering the first sulphur precipitator.

The precipitator is of the Cottrell electrical type. It comprises generally a sulphur catch basin 30 joined to the shell 31 in which are fixed headers 32 and 33 mounting the precipitator treater tubes 35. The cover 36 is suitably mounted in a seal 37. Suspended from the cover and insulated therefrom by the seal, which may be sulphur or oil, are the weighted wires 38. It may be noted the wire weights 39 are immersed in the sulphur pool 40, which may be maintained in liquid state and at a desirable temperature by means of a heater coil 41 which may be heated in any desirable way such as by steam. The space between the cover and header provides a precipitator outlet chamber 42. The catch basin 30 is provided with a sulphur drain-off conduit 43 having a valve 44 and a drain-out conduit 45 provided with a valve 46.

Leading from the precipitator outlet chamber 42 is a conduit 47 connecting with conduit 47a passing through heat exchanger 16 in heat interchange relationship with conduit 13—20. Conduit 47b, being an extension of 47a, is connected with conduit 49. A conduit 50 connecting conduits 47a and 47b having a valve 51 provides an adjustable by-pass around heat exchanger 16.

The first converter 21 and first sulphur precipitator 27 together with their supplementary and auxiliary parts is herein designated for convenience as the first stage of the system. In the second stage of the system there is provided a second catalyst chamber or converter 54, a heat exchanger 55 and an electrical precipitator 56.

Conduit 49 connects with the second converter 54 which is provided also with a suitable catalyst such as bauxite. Heat exchanger 55 comprises a shell 57 in which are headers 58 and 59 mounting the heat exchanger tubes 60. Leading from converter 54 and connected to the heat exchanger inlet chamber 61 is a conduit 62. The space between the header 59 and the bottom end of the shell 57 provides an outlet chamber and liquid sulphur catch basin 63.

A conduit 64 provided with an orifice plate or baffle 65 connects the outlet chamber 63 with the catch basin chamber 30a of the second precipitator 56. This precipitator is substantially the same in construction as the first precipitator 27, and the corresponding parts are designated by the same reference characters with the suffix a. There is, however, this significant difference: A conduit 66 is connected to conduit 64 between the heat exchanger 55 and the orificed baffle 65 and leads into the space between the headers 32a and 33a. Moreover, header 33a is provided with a plurality of openings 67 to provide passageway between the space outside the tubes 35a between the headers and the catch basin 30a. By this arrangement, the gas stream carrying sensible heat, as will be described hereinafter more in detail, leaving the heat exchanger outlet chamber 63 may be directed into the precipitator shell and around the precipitator tubes to maintain the precipitator at desired and stabilized temperature while any sulphur liquefied in the heat exchanger may gravitate into the liquid sulphur pool 40a through the orifice at the bottom of baffle 65.

A conduit 70 connects the outlet chamber 42a with the space inside the shell 57 between the headers 58 and 59 of the heat exchanger 55 and a conduit 69 connects the same space with the third catalyst chamber or converter 71. It may be noted that heat exchanger 55 is arranged for counter-current flow.

In the third stage of the system there is provided a converter 71, a gas cooler 72 and a sulphur precipitator 73. A conduit 74 leads from converter 71 to the inlet chamber 75 of the gas cooler 72. The gas cooler tubes 76, which may be cooled by air radiation connects with an outlet chamber and catch basin 77 which in turn is connected by conduit 78 to the inlet chamber and sulphur catch basin 30b of the electrical sulphur precipitator 73. It may be noted the construction of precipitator 73 is generally similar to precipitator 56 and the corresponding parts are designated by like reference characters with the suffix b.

A conduit 79 connects conduit 78 between the cooler 72 and the orifice baffle plate 80 to the space inside the shell 31b between the headers 32b and 33b. It will be noted header 33b is provided with a plurality of openings 67b which connect the inside of the shell 31b with the inlet chamber 30b of the third sulphur precipitator 73. A pipe 81 connected to precipitator outlet chamber 42b provides a vent stack for releasing residual gas to the atmosphere. It will be apparent also that the sulphur catch basin of precipitator 56 is provided with a draw-off 43a having a valve 44a and a drain-off 45a having a valve 46a. The catch basin of precipitator 73 is provided with a draw-off 43b having a valve 44b and a drain-off 45b having a valve 46b.

A conduit 82, having a normally closed valve 83, connects the hot gas stream conduit 13 with conduit 49 and a conduit 84, having a normally closed valve 85, connects conduit 49 and conduit 69. This arrangement provides a means for utilizing sensible heat in the hot gas stream for regenerating or "cooking out" the catalyst from time to time in the second and third converters when the catalyst becomes fouled by an accumulation of sulphur deposited on it.

According to one method and manner of operating a brimstone recovery plant constructed in accordance with the invention, clean raw roaster or smelter gas which may contain 7% to 8% sulphur dioxide and also a substantial quantity of oxygen is forced continuously through conduit 15 into the reduction furnace 10. A proper amount of natural gas is continuously introduced into the furnace through inlet 11 to reduce the sulphur dioxide. A temperature conducive to rapid reduction is maintained in the furnace. Satisfactory results have been obtained by maintaining a temperature in the reduction furnace above 1200° C. and it is preferred to maintain the temperature in the neighborhood of about 1200° to 1250° C. although this temperature may be varied somewhat. The amount of natural gas introduced will be such as to maintain a proper balance. We have found in the gases ordinarily treated by us that 9.5%–10% by volume of the smelter gas passing into the furnace is a proper amount of natural gas for good results.

Ordinarily the gases treated in our operations have contained 7%–8% sulphur dioxide and also sufficient residual oxygen (of the order of 10%) so that the introduction of air into the reduction furnace with the natural gas is unnecessary. However, when the grade of smelter gas increases, say to 10% or more of sulphur dioxide, the percentage of oxygen contained in it may be diminished to an extent requiring the introduction of air into the furnace to make up the oxygen deficiency to maintain the desired combustion.

The hot gases will tend to cool as they leave the furnace through the conduit 13 and will reach the primary heat exchanger 14 at about 1050° to 1100° C. if an average temperature of 1200° to 1250° is maintained in the furnace. The hot gas stream then passes through heat exchanger 14 in heat interchange relationship with the raw gas passing toward the furnace through conduit 15.

This primary heat exchanger performs a duofold function. The hot gas stream leaving the furnace is gradually cooled to the neighborhood of 700° C. and the raw gas passing into the furnace is raised several hundred degrees from atmospheric temperature. By so preheating the raw gas it is possible to return a very substantial amount of heat to the furnace, thus materially speeding up combustion and increasing the capacity of the furnace.

The hot gas stream leaving the primary heat exchanger 14 is then passed through a secondary heat exchanger 16 through the conduit 13 into heat interchange relationship with the gas stream from the first sulphur precipitator which is provided in the first stage of the system. The hot gas stream is further cooled in the secondary exchanger 16 to the neighborhood of 450°–500° C.

The smaller cooler 22 which, as shown, is of the trombone type, is utilized to adjust the temperature of the gas stream entering the first converter 21. By regulating the by-pass valve 25 and by the use of the water spray header 23 the temperature may be delicately controlled so that the temperature in the first converter will be conducive to the conversion of carbon oxysulphide, which invariably is present in the gas stream entering this converter. Preferably, a temperature of 400°–500° C. is maintained in the first converter.

The gas stream leaving this converter being too hot for efficient precipitation of sulphur is then cooled to the neighborhood of 120°–130° C. and preferably to about 125° C. before being introduced into the tubes of the first precipitator. As shown, the hot gas stream is given an initial cooling in cooler 28 which may be in the form of a waste heat boiler and then a further cooling in cooler 29 which may be in the form of a feed water heater.

The cooled gas stream passes up through the treater tubes 35 of the first sulphur precipitator where a substantial amount of sulphur is precipitated and collects as liquid in the catch basin 30. It is significant to note that the weights 39 attached to the wires 38 extend into the liquid sulphur pool 40. This arrangement maintains the wires centered in the treater tubes; whereas otherwise the wires are inclined to sway off-center, particularly if the velocity of the gas stream is substantial. The sulphur pool is kept at a temperature above the melting point of sulphur and auxiliary heating means, such as a steam heated coil 41, may be used for this purpose if additional heat is required. The collected sulphur may be drawn off through pipe 43 from time to time and solidified for easy handling. The drain-off 45 is provided to empty the catch basin 30.

The cool gas stream leaving the first precipitator is then passed through heat exchanger 16 where its temperature is raised for introduction into the second stage of the system. By means of by-pass valve 51 the temperature of the gas stream passing into converter 54 through conduit 49 may be regulated. We introduce the gas stream into this second converter at a temperature from 200°–225° C. and preferably at about 210° C. Inasmuch as the reaction which takes place in the converter is exothermic, a large amount of heat is evolved, particularly in a large scale plant. Consequently, the gas stream leaving this converter may have a temperature of the order of 260°–275° C. or even higher. This temperature is too high for efficient conversion of the sulphur by means of the reaction

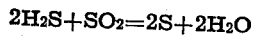

$$2H_2S + SO_2 = 2S + 2H_2O$$

In fact this reaction will begin to reverse itself at slightly over this temperature and for this reason must be reduced. To accomplish this reduction in temperature of the gas stream, it is passed through heat exchanger 55. In this exchanger the gas stream leaving converter 54 and entering precipitator 56 is cooled by the gas stream leaving the precipitator through conduit 70 and at the same time the stripped gas stream is heated so that the stream entering the converter 71 in the third stage of the system will have a temperature of the order of 200°–225° C. and preferably about 210° C.

Such sulphur as may condense out of the gas stream passing down through tubes 60 of heat exchanger 55 will collect in catch basin 63 and may gravitate through conduit 64 through the orifice of plate 65 into the liquid sulphur pool 40a.

The gas stream entering conduit 64 may be of the order of 150° C. or thereabout, which is too high for best precipitation of sulphur. In accordance with the invention we utilize the sensible heat to stabilize the temperature of the precipitator which ordinarily will have a large heat radiating surface and the arrangement is such that the gas stream entering the precipitator tubes may be cooled to the neighborhood of 120°–130° C. and preferably to about 125° C. for efficient precipitation. To accomplish this desirable end a conduit 66 leads from the conduit 64 in advance of the orifice plate 65 and then into the shell of the precipitator. By adjusting the size of the orifice, the gas stream may be divided so that a sufficient amount of the gas passes through conduit 66 and around the treater tubes 35a and through the passages 67 so that the temperature of the gas entering the treater tubes may be maintained at about 125° C.

By passing at least a part of the gas stream into the shell of the precipitator, the inner surfaces of the treater tubes may be maintained at all times at above the melting point of sulphur and at the same time at a temperature which is low enough to be conducive to most efficient precipitation of the elemental sulphur out of the gas stream. Accordingly, as the sulphur is precipitated upon the inner surfaces of the treater tubes it will readily flow down by gravity into catch basin 30a and thus keep the inner surfaces of the tubes clean without depositing and maintaining thereon a thick coating of sulphur which would act as a dielectric and adversely affect efficient operation of the electrical precipitator. It will be apparent that liquid sulphur may be drawn from pool 40a as from the other precipitators. The cool stripped gas stream which may still contain some $H_2S$ and $SO_2$ passes from the second precipitator through exchanger 55 where the temperature of the stream is again raised for introduction into the third stage of the system.

The gas stream is then introduced into converter 71 in the third stage through conduit 69 at a temperature of the order of 200°–230° C. and preferably at about 210° C. There being only a relatively small amount of sulphur in the stream entering the third stage of the system (of the order of 1% by volume of combined $H_2S$ and $SO_2$) the temperature rise in the third converter 71 is rather moderate. Nevertheless, additional quantities of $H_2S$ and $SO_2$ are converted to elemental sulphur and the gas stream will leave this converter at a temperature of about 230° C., more or less depending upon the temperature of the gas entering and the temperature maintained in the converter.

The gas stream is then cooled in the gas cooler 72 which may be cooled by radiation. Any sulphur condensing in the cooler tubes 76 will collect in catch basin 77 and gravitate through conduit 78 through the orifice in baffle 80 into the liquid sulphur pool 40b.

As in the case of the electrical precipitation in the second stage of the system, the gas stream is introduced into the bottom of treater tubes 35b of the precipitator in the third stage at a temperature of about 125° C. All, or at least a sufficient part, of the gas stream leaving cooler 72 is passed through conduit 79 into shell 31b, around the treater tubes and through the passages 67b to maintain the inner surfaces of the tubes above the melting point of sulphur and to cause the gas to enter the treater tubes at about 125° C. in a similar manner and for a like purpose as that described in connection with the second stage of the process. The precipitated sulphur collects in the liquid pool 40b and may be drawn off from time to time and solidified for easy handling. The stripped residual gas is then vented to the atmosphere through stack 81.

It may be noted that the first stage of the system may be provided, if desired, with a precipitator and heat exchanger, as shown and described in connection with stage two, instead of the arrangement shown in the drawings.

By carefully controlling the balance between the raw gas and natural gas introduced into the system a sulphur of exceptionally high quality, substantially free from impurities may be produced and the amount of combined $H_2S$ and $SO_2$ in the tail gas vented to the atmosphere need not exceed 0.5% or even less. We prefer to introduce the raw gas and natural gas into the system in a ratio which will maintain a ratio of $H_2S$ and $SO_2$ in the tail gas of 2 to 1 as this balance is very conducive to efficient conversion in the system.

In the operation of a plant of commercial proportions it is desirable to regenerate the catalyst or "cook out" the converters from time to time and particularly those in the second and third stages of the system. This may be accomplished by introducing the hot gas stream from the furnace directly into the converters for a short period from time to time. By opening valve 83 the hot gas may be introduced directly into conduit 49 through conduit 82 to "cook out" or vaporize any sulphur which may have been deposited on the catalyst mass in converter 54. By opening valve 83 and 85 the hot gas stream may be introduced directly into conduit 69 to "cook out" converter 71. This cooking out may be performed from time to time as desired and will require only a period which will be of sufficiently short duration and of sufficiently infrequent occurrence that there will not be any material lessening of the overall efficiency of the system over extended periods of operation.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a system for recovery of brimstone from gases containing sulphur dioxide, the combination with an electrical sulphur precipitator of the Cottrell type comprising a shell, treater tubes within said shell, electrode wires suspended in said tubes, and a catch basin to collect precipitated sulphur, a converter containing a catalyst mass, a gas cooler receiving the gas stream from said converter and delivering it to said precipitator, and a conduit for conveying the gas stream from the converter to the gas cooler, of conduit means arranged to positively direct a requisite portion of said gas stream from the gas cooler into the top of said shell and thence downwardly around said tubes and to deliver the remainder of the gas stream from the gas cooler directly into the bottom of said shell.

2. A system for reducing sulphur dioxide with natural gas comprising a reduction furnace, a first catalyst chamber, gas conduit means for delivering gases from the reduction furnace to said first catalyst chamber, a first sulphur precipitating unit, a second catalyst chamber, conduits for supplying gases from said first catalyst chamber to said first precipitating unit and thence to said second catalyst chamber, a second precipitating unit, a third catalyst chamber, conduits for supplying gases from said second catalyst chamber to said second precipitating unit and thence to said third catalyst chamber, a third precipitating unit, conduits for supplying gases from said third catalyst chamber to said third precipitating unit, gas cooling means in said conduits immediately preceding the first and third precipitating units, a heat exchanger in the conduit lines interconnecting the reduction furnace and first catalyst chamber and the first precipitating unit and second catalyst chamber, respectively, another heat exchanger in the conduit lines interconnecting the second catalyst chamber and second precipitating unit and the second precipitating unit and third catalyst chamber, respectively, and conduit means for by-passing hot gases from a point intermediate said reduction furnace and said first catalyst chamber directly to said second and third catalyst chambers for regenerating the latter chambers by the sensible heat of the hot gases.

3. A method of recovering sulphur on a large plant scale from gaseous mixtures of the character described which comprises burning the gases with natural gas to reduce sulphur dioxide to sulphur, cooling the resulting hot gas stream to the neighborhood of 450°–500° C., then passing the gas stream through a first converter, thence through a gas cooler into an electrical precipitator, then heating the gas stream to a temperature of the order of 200°–225° C. and passing it through a second converter, then cooling the gas stream and passing it through a second precipitator, then heating the gas stream to a temperature of the order of 200°–225° C. by heat exchange with the gas stream from the second converter and passing it through a third converter, then cooling the gas stream and passing it through a third precipitator.

4. In a process for recovery of sulphur from gaseous mixtures of the character described containing sulphur dioxide which includes burning the sulphur dioxide containing gas with natural gas, passing the resulting gas stream over a catalyst whereby an exothermic reaction takes place imparting sensible heat to said gas stream, partially cooling the stream and subjecting the cooled stream to an electrical precipitation treatment, the step which comprises utilizing the heat still retained in the cooled gas stream to stabilize the precipitation treatment temperature by circulating a portion of the cooled gas stream about the precipitation environment in heat exchange relationship therewith just prior to its entering the same and passing the other portion of the cooled gas stream directly into said environment.

5. In a process for recovery of sulphur from gaseous mixtures containing sulphur dioxide which includes burning the gaseous mixture with natural gas to reduce sulphur dioxide and form a gas stream, then passing the gas stream through a catalyst mass to speed up the formation of elemental sulphur, and electrically precipitating elemental sulphur from the gas stream, the step which comprises passing sufficient of the gas stream in countercurrent heat exchange but non-admixed flow to the gas stream from which sulphur is being precipitated to stabilize the electrical precipitation environment at a temperature of from slightly above the melting point of sulphur to 10° C. above said point.

6. A method for recovery of sulphur from gaseous mixtures containing sulphur dioxide which comprises burning the raw gas with a reducing hydrocarbon gas in a reduction furnace maintained at a temperature conducive to rapid reduction of sulphur dioxide, then cooling the hot gas stream thus produced and passing it through a first catalyst chamber containing a catalyst while maintaining the temperature above 400° C., then cooling the gas stream and precipitating elemental sulphur out of the gas stream in a first electrical precipitator maintained at a temperature above the melting point of sulphur and not exceeding about 130° C., then raising the temperature of the gas stream and passing it through a second catalyst chamber containing a catalyst while maintaining the temperature above 200° C., then cooling the gas stream and precipitating elemental sulphur out of the gas stream in a second electrical precipitator maintained at a temperature above the melting point of sulphur but not exceeding about 130° C. by dividing the gas stream, one portion of which is passed directly into the tubes of said second electrical precipitator and the other portion circulated around the tubes thereof immediately preceding its passage thereinto, then heating the gas stream and passing it through a third catalyst chamber containing a catalyst while maintaining the temperature between about 200° and 230° C., then cooling the gas stream and precipitating elemental sulphur out of the gas stream in a third electrical precipitator maintained at a temperature above the melting point of sulphur but ot exceeding about 130° C. by again dividing the gas stream, one portion of which is passed directly into the tubes of said third electrical precipitor and the other portion circulated around the tubes thereof immediately preceding its passage thereinto.

7. In a process for recovery of sulphur from gaseous mixtures containing sulphur dioxide which includes burning the gaseous mixture with natural gas to reduce sulphur dioxide and form a gas stream, then passing the gas stream through a catalyst mass to speed up the formation of elemental sulphur, and electrically precipitating elemental sulphur from the gas stream, the improvement which comprises flowing a portion of the gas stream around the electrical precipitation environment to stabilize the temperature within said environment at a temperature conducive to precipitation of sulphur, then mixing said portion with the other portion of the gas stream and passing the mixture through the environment so stabilized and maintaining the precipitated sulphur in the molten state until withdrawn from the process.

8. The process for producing elemental sulphur which comprises reducing sulphur dioxide in a gas mixture by firing with natural gas to form an initial gas stream, cooling said initial gas stream by passing same in heat exchange relationship with a first tail gas stream and passing the cooled initial gas stream through a first catalytic mass conducive to sulphur formation, cooling the gas stream emerging from contact with said first catalytic mass and passing the cooled stream through a first electrical precipitation environment to precipitate sulphur and yield the first tail gas stream, conducting said first tail gas stream in heat exchange relationship with the initial gas stream as aforesaid and thence through a second catalytic mass, cooling the gas stream emerging from contact with said second catalytic mass and passing the cooled gas stream through a second electrical precipitation environment to precipitate additional sulphur and yield a second tail gas stream, conducting said second tail gas stream in heat exchange relationship with the gas stream passing from said second catalytic mass to said second electrical precipitation environment and thence through a third catalytic mass, cooling the gas stream emerging from contact with said third catalytic mass and passing the cooled gas stream through a third electrical precipitation environment to precipitate still additional sulphur and yield a final tail gas stream, and stabilizing the temperature of at least one of said electrical precipitation environments by dividing the cooled gas stream about to enter such environment into portions, flowing one portion directly into the environment, and flowing the other portion around the environment in heat exchange with gases passed therethrough but without admixture therewith and thence into the environment.

EDWARD P. FLEMING.
T. CLEON FITT.

REFERENCES CITED

The following references are of record in the file of this patent:

UNITED STATES PATENTS

| Number | Name | Date |
|---|---|---|
| 1,444,627 | Meston | Feb. 26, 1923 |
| 2,063,391 | Malick | Dec. 8, 1936 |
| 2,143,365 | Skelleftehamn | Jan. 10, 1939 |
| 2,168,150 | Baehr et al. | Aug. 1, 1939 |
| 2,270,427 | Fleming et al. | Jan. 20, 1942 |
| 2,298,641 | Schulze et al. | Oct. 13, 1942 |
| 2,388,259 | Fleming et al. | Nov. 6, 1945 |

FOREIGN PATENTS

| Number | Country | Date |
|---|---|---|
| 109,106 | Great Britain | Sept. 5, 1916 |
| 416,209 | Great Britain | Nov. 14, 1933 |